United States Patent [19]

Terajima

[11] Patent Number: 4,837,813
[45] Date of Patent: Jun. 6, 1989

[54] FACSIMILE APPARATUS WITH DEVICE TO DETERMINE LINE CHANGES, AND HAVING A POWER CONSERVATION FEATURED

[75] Inventor: Hisao Terajima, Yokohama, Japan

[73] Assignee: Canon Kabushiki Kaisha, Tokyo, Japan

[21] Appl. No.: 125,004

[22] Filed: Nov. 24, 1987

[30] Foreign Application Priority Data

Dec. 1, 1986 [JP] Japan .................................. 61-287177
Dec. 1, 1986 [JP] Japan .................................. 61-287185

[51] Int. Cl.⁴ .......................................... H04M 15/18
[52] U.S. Cl. .................................... 379/113; 379/130;
379/140; 379/100; 379/413
[58] Field of Search ............... 379/114, 113, 116, 119,
379/130, 140, 90, 100, 413

[56] References Cited

U.S. PATENT DOCUMENTS

4,656,657  4/1987  Hunsicker .......................... 379/119

Primary Examiner—Stafford D. Schreyer
Attorney, Agent, or Firm—Fitzpatrick, Cella, Harper & Scinto

[57] ABSTRACT

A communication apparatus (e.g., a facsimile apparatus) has a monitor circuit to monitor line release after a line has been captured, a memory for storing information on a line release time when the line release is detected, and a control unit for controlling the apparatus. The control unit receives the time information from the memory at an end of a predetermined operation and can compute the appropriate time charge. A stand-by power source powers various components of the apparatus at certain times when full power is not needed, saving power use.

12 Claims, 6 Drawing Sheets

| FIG.5(A) | FIG.5(B) |

FACSIMILE APPARATUS WITH DEVICE TO DETERMINE LINE CHANGES, AND HAVING A POWER CONSERVATION FEATURED

BACKGROUND OF THE INVENTION

1. Field of the Invention

The present invention relates to a communication apparatus, and more particularly to a communication apparatus for measuring a communication time.

2. Related Background Art

A facsimile machine which has a function to measure a communication time of the facsimile machine and calculate a charge based thereon and display it or print it out on a record sheet, has been known. In order for such an apparatus to calculate the exact charge, it is necessary to measure exactly the line capture time.

In the prior art facsimile machine, it is usual to measure the time during which the facsimile machine captures the line. In such an apparatus, if an operator leaves the handset of a telephone set connected to the facsimile machine off the hook when the communication is terminated, the line is kept captured by the telephone set even if the line is switched from the modem to the telephone set, and the charge continues to accrue. Nevertheless, the facsimile machine calculates the charge based on the time to the termination of communication. As a result, the actual charge for the use of the line does not coincide with the charge indicated by the facsimile machine.

It has been proposed to provide a detector to detect whether the line is captured or not so that the time is measured if the off-hook state is detected at the end of communication and the time and charge are calculated and displayed when the line is released.

In this method, however, when the line is captured while the telephone set is in the off-hook state after the termination of communication, a control unit is in operation only for measuring the time, and power is wasted.

Further, in this method, if the control unit is busy, for example, in a copy operation when the telephone set is finally hung up, the release of the line is detected only after the busy status has been released or terminated. As a result, the exact line capture time cannot be measured.

U.S. patent application Ser. Nos. 915,430, filed on Oct. 6, 1986, and 009,528, filed on Feb. 2, 1987, both assigned to the assignee of the present invention, display prediction of communication end time or communication charge.

SUMMARY OF THE INVENTION

It is an object of the present invention to improve a communication apparatus as described above.

It is another object of the present invention to eliminate the above problems.

It is a further object of the present invention to provide a communication apparatus which can exactly measure line capture time.

It is still a further object of the present invention to provide a communication apparatus which can exactly measure line capture time and which consumes low power.

It is a further object of the present invention to enable a communication apparatus having a data communication function to measure an exact line capture time.

According to one aspect of the present invention is provided a communication apparatus having a data communication function and a speech function, in which the main power to the data communication function is turned off while the power to a line capture monitor unit is kept on, when the mode is switched from the data communication mode to the speech mode.

According to another aspect of the present invention is provided a communication apparatus in which a capture time is stored when a captured line is released, and the stored capture time is processed after data processing operation so that the exact capture time is measured irrespective of the data processing.

Other objects, features and advantages of the present invention will be apparent from the following detailed description of the preferred embodiments, taken in conjunction with the accompanying drawings.

BRIEF DESCRIPTION OF THE DRAWINGS

FIG. 4, consisting of FIGS. 4(A) and 4(B), shows a control flow chart of a sub-control unit of FIG. 1, and FIG. 5, consisting of FIGS. 5(A) and 5(B), shows a control flow chart of a main control unit of FIG. 1.

DETAILED DESCRIPTION OF THE PREFERRED EMBODIMENTS

Figure 1:
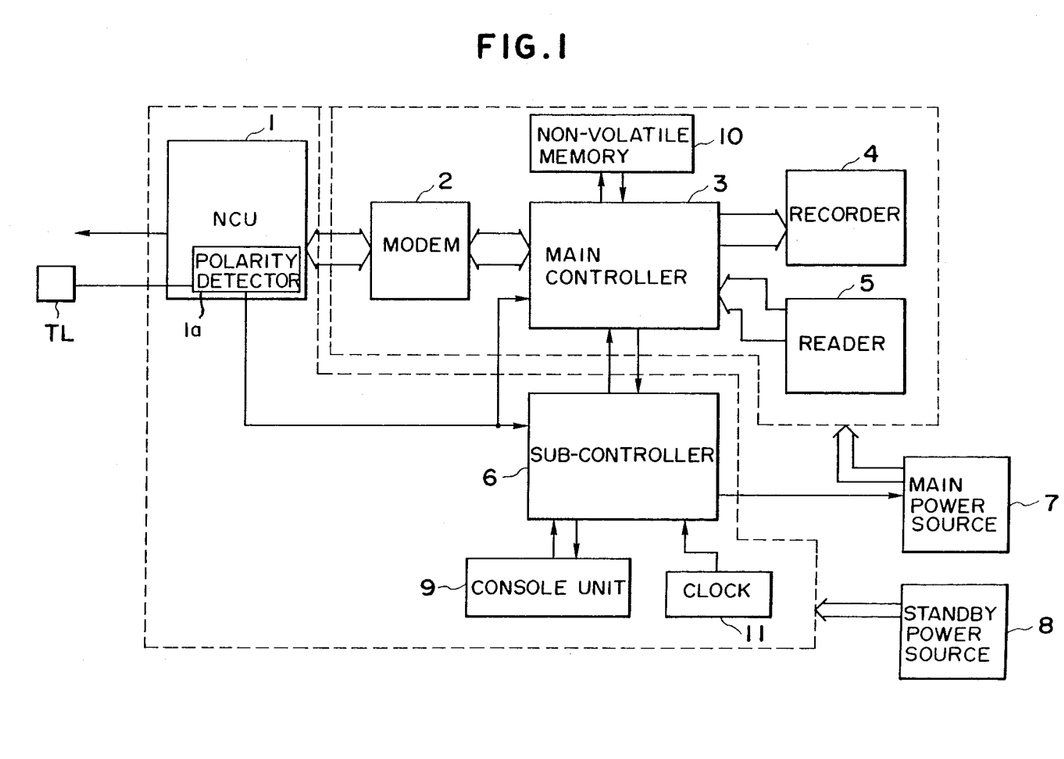
FIG. 1 shows a block diagram of one embodiment of the present invention.

FIG. 1 shows a block diagram of one embodiment of a facsimile machine in accordance with the present invention. Numeral 1 denotes a network control unit (NCU) which selectively connects a line to a modem 2 which modulates and demodulates transmission/receive signals and an associated telephone set T1. The NCU 1 contains a circuit 1a to detect a DC polarity of the line, and an output thereof is supplied to a main control unit 3 and a sub-control unit 6. The main control unit 3, which controls the overall system and encodes and decodes image data, is connected to the modem 2. The main control unit 3 comprises a microcomputer and peripheral units of the microcomputer.

A record unit 4 such as a thermal recorder for recording a received image and a reader unit 5 such as a CCD sensor for reading a transmission image are connected to the main control unit 3. Outputs of console unit 9, clock 11 and polarity detector 1a are supplied to the sub-control unit 6.

Numeral 7 denotes a main power supply which supplies power to the main control unit 3, record unit 4 and reader unit 5. It is turned on and off under the control of the sub-control unit. Numeral 8 denotes a stand-by power supply which continuously supplies powers to the sub-control unit 6 and the NCU 1.

Figure 3:
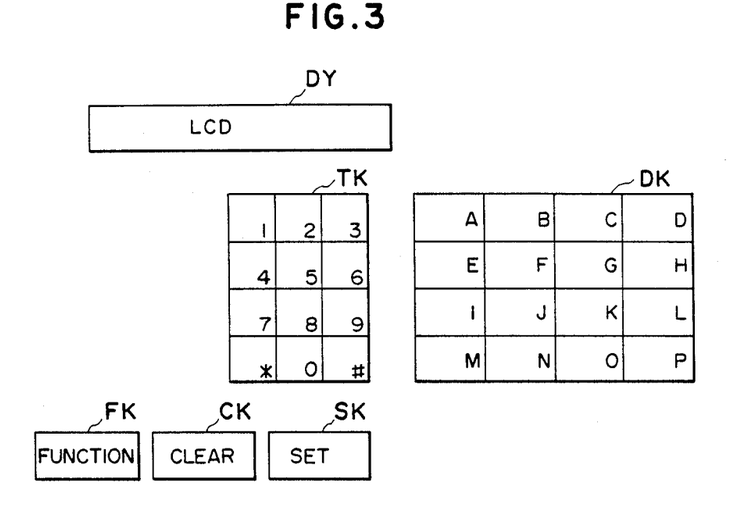
FIG. 3 shows an external view of a console unit.

Numeral 9 denotes the console unit through which an operator controls the facsimile machine. FIG. 3 shows the console unit. A ten-key TK for inputting numerals is arranged at the center, one-touch call keys DK are arranged to the right. A space for an address seal is provided on each key. A function key FK used for registration, a set key SK, a clear key CK and a liquid crystal display DY used for confirmation of the operation are provided.

Numeral 10 denotes a non-volatile memory which stores addressee telephone numbers corresponding to the one-touch call keys DK and a line capture start time. The memory 10 holds its memory content even during the off state of the main power supply.

Figure 2:
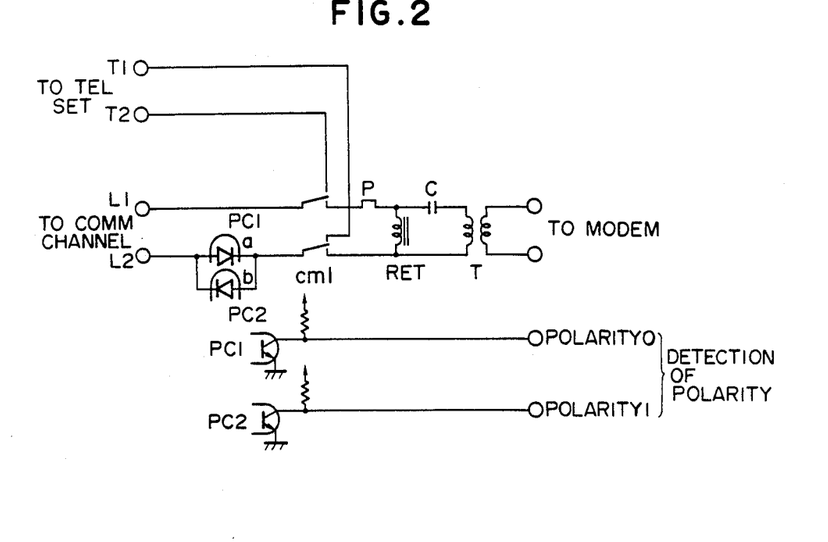
FIG. 2 shows a circuit diagram of an NCU of FIG. 1.

FIG. 2 shows a circuit diagram of the NCU of the embodiment. A line is connected to L1 and L2 and a telephone set is connected to T1 and T2. When no communication is made, contacts cm1 are connected to T1 and T2. If the telephone set is taken off the hook, to recapture the line, a current flows through a photo-coupler PC1 or PC2 (depending on the polarity of current) and one of POLARITY 0 and 1 is set to the L (logic "low") level. Thus, the facsimile machine can determine whether the line is captured (or occupied) by the telephone set or not. During the communication, the contacts cm1 are connected to the modem and a contact P is turned on. Thus, a DC current flows through a coil RET to capture the line. A voice band signal is sent to the modem 2 (FIG. 1) through a capacitor C and a transformer T, or it is sent to the line through the transformer T and the capacitor C. During the communication or while the line is captured by the telephone set, a DC current flows through one of the photo-couplers PC1 and PC2 so that one of the POLARITY 0 and 1 is set to the L level. Thus, the facsimile machine can detect the polarity of the line. By disconnecting the contact P while the contacts cm1 are connected to the modem, an out-pulse type select signal may be supplied to an exchanger.

When the facsimile machine is to be connected to the line, the terminal L1 is connected to a negative pole and the terminal L2 is connected to a positive pole. The operator stores the addressee telephone numbers corresponding to the one-touch transmission keys on the console panel.

Figures 4, 4A:
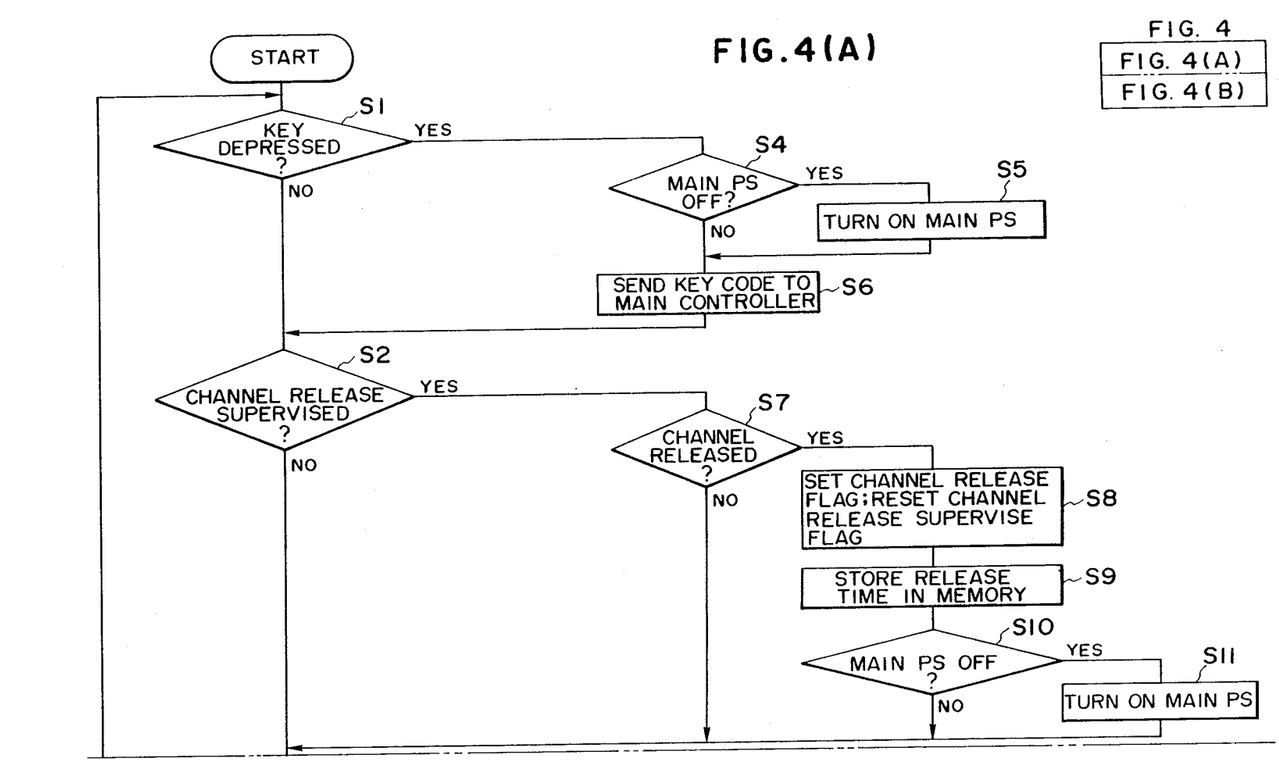
Figure 4B:
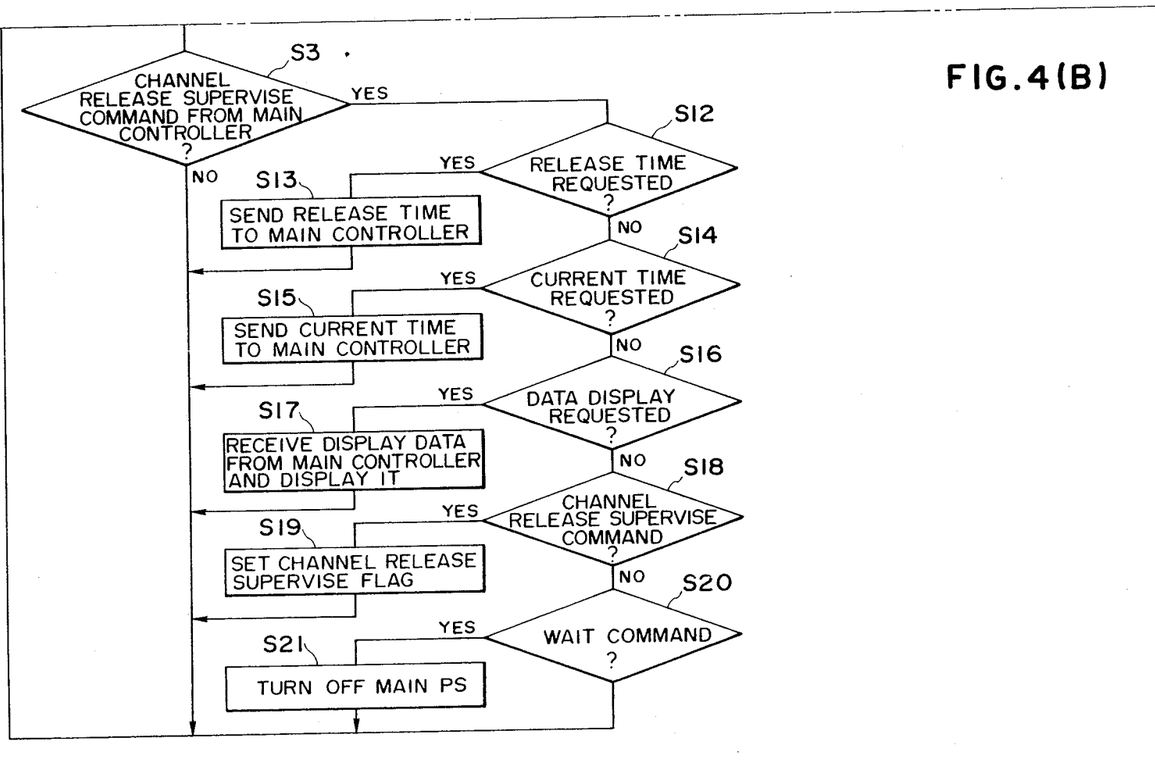
Figures 5, 5A:
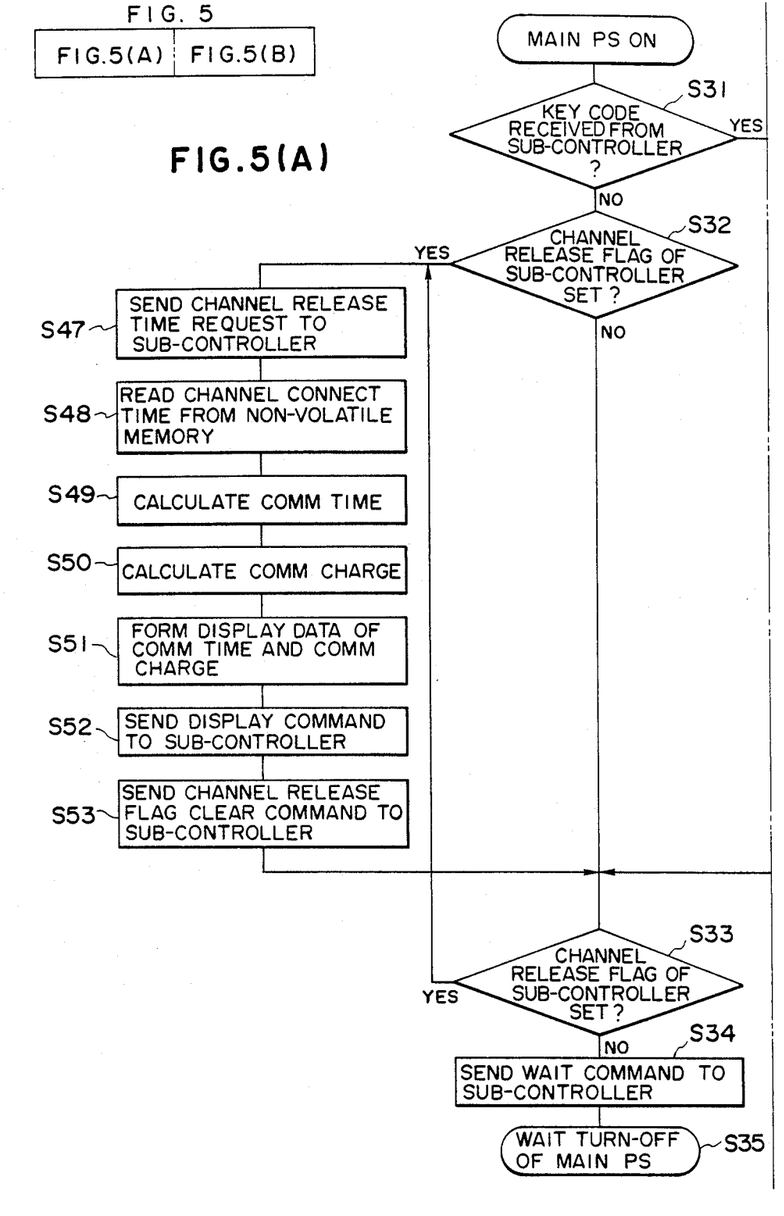
Figure 5B:
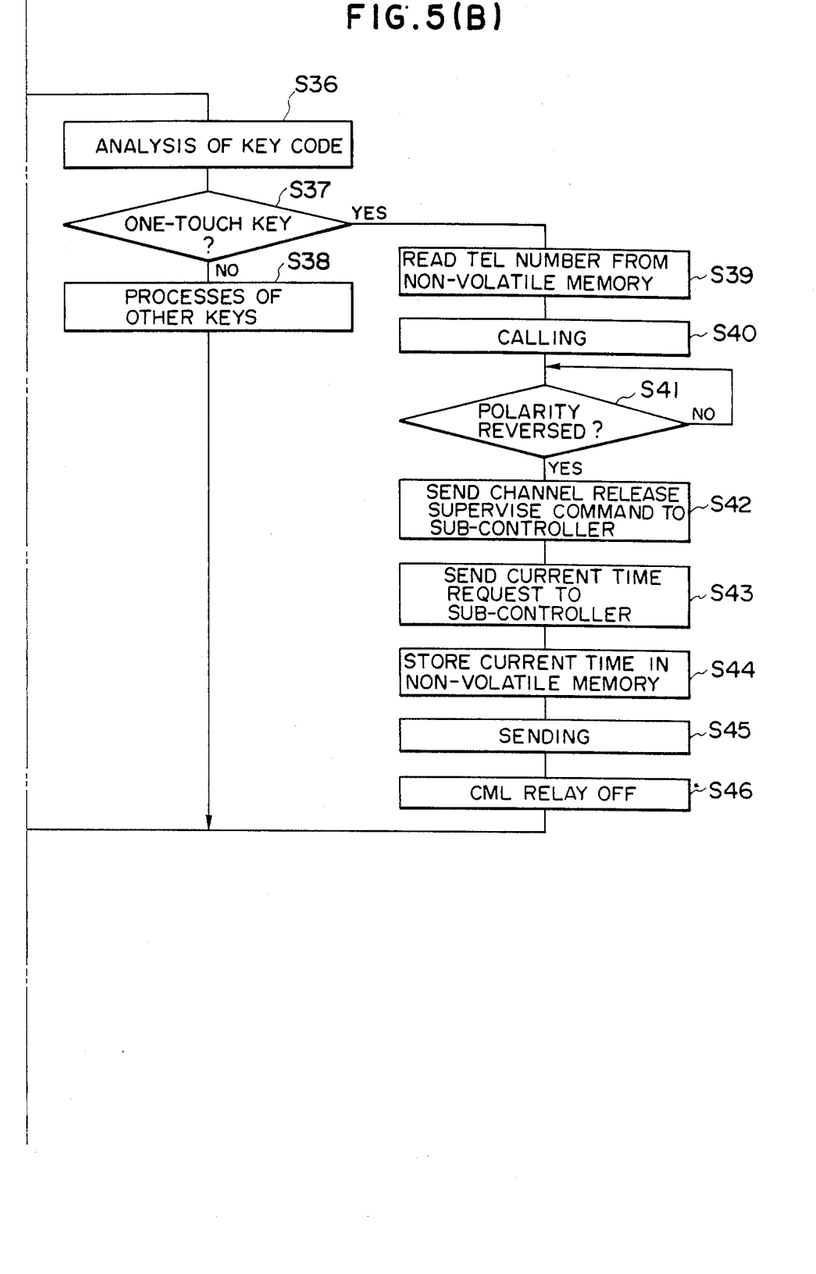

The transmission operation is now explained with reference to an operation flow chart of the sub-control unit shown in FIG. 4 and an operation flow chart of the main control unit shown in FIG. 5.

In a stand-by state, the main power supply 7 is turned off and the main control unit 3 is not in operation. The sub-control unit 6 carries out a loop of steps S1, S2 and S3. (The operations of those steps are described in the corresponding blocks of FIG. 4. The operations of other steps referred to in the following description are also described in FIGS. 4 or 5.) When the operator sets a document in the facsimile machine and depresses the one-touch transmission key DK, the sub-control unit 6 detects it and the steps S1 to S4 are carried out, and since the main power supply 7 is off, the step S5 is carried out to turn on the main power supply. When the sub-control unit 6 turns on the main power supply 7, the main control unit 3 starts to operate and receives a key code specified by the one-touch transmission key DK from the sub-control unit 6 in the step S31, and then the step S36 is carried out. As the sub-control unit 6 sends the key code of the one-touch transmission key DK to the main control unit 3 in the step S6, it proceeds to the step S2 and repeats the loop of the steps S1–S3. The main control unit 3 analyzes the key code in the step S36, and when it detects the key code of the one-touch transmission key DK, it proceeds to a step S39, where the addressee telephone number corresponding to the one-touch transmission key DK is read from the non-volatile memory 10. In a step S40, the contacts cm1 are switched from the telephone set TL to the modem, and the pulse relay contact p is turned on and off to send the out-pulse type select signal to the line. Alternatively, a DTMF (dual tone multi-frequency) type select signal is sent from the modem to the line. In a step S41, POLARITY 0 and POLARITY 1 are monitored, and if the polarity reversal is detected, a step S42 is carried out. In the step S42, a line release monitor command is issued to the sub-control unit 6. When the sub-control unit 6 receives the command from the main control unit 3, the process proceeds from the step S3 to the step S12. Since it is not a line release time request, or current time request or display request, the process proceeds from the step S12 to steps S14, S16 and S18, and then to S19, and a line release monitor flag is set to monitor whether the line has been subsequently released or not. Then the process returns to the step S1, and the loop of the steps S1, S2, S7 and S3 is repeated.

In a step S43, the main control unit 3 issues the current time request command to the sub-control unit 6. When the sub-control unit 6 receives it, the process proceeds from the step S3 to the steps S12 and S14. Since it is the current time request command, the process proceeds to a step S15 where a time is read from the clock 11 and the time data is sent to the main control unit 3. Then, the process returns to the loop of the steps S1, S2, S7 and S3. When the main control unit 3 receives the time data, it stores the time data into a line capture time memory of the nonvolatile memory 10 in a step S44. In a step S45, it sends the document data. In a step S46, the relay contacts cm1 are turned off and the line is switched back to the telephone set TL from the modem.

The main control unit 3 then proceeds to a step S33. The subsequent operation is explained for two cases.

(A) The telephone set is in the on-hook state at the end of transmission.

(B) The telephone set is in the off-hook state at the end of transmission.

(A) If the telephone set is in the on-hook state at the end of transmission, the line is released when the contacts cm1 are switched to the telephone set TL in a step S46.

If the sub-control unit 6 is then carrying out the loop of the steps S1, S2, S7 and S3, the process proceeds from the step S7 to the step S8 because the line is released. In the step S8, a line release flag, to inform the main control unit 3 of the line release, is set and the line release monitor flag is reset. Thus, the line release is no longer monitored. In a step S9, the time is read from the clock and the time data is stored in the release time memory of the sub-control unit 6. In a step S10, whether the main power supply 7 is on or off is checked. Since it is on, the process proceeds to the step S3. The line release is no longer monitored and the loop of the steps S1, S2 and S3 is repeatedly carried out.

The main control unit 3 switches the contacts cm1 in the step S46, and in a step S36, it checks whether the line release flag of the sub-control unit 6 has been set or not. Since it has been set, the process proceeds to a step S47. In a step S48, a line release time request command is issued to the sub-control unit 6.

When the sub-control unit 6 receives the command, it proceeds to the steps S3, S12 and S13, where it reads the line release time from the release time memory and sends it to the main control unit 3. Then it returns to the loop of the steps S1, S2 and S3.

When the main control unit 3 receives the release time from the sub-control unit 6 in the step S47, it reads, in a step S48, the line capture time stored in the nonvolatile memory 10 in the step S44. In a step S49, a difference between those two times is calculated to determine the line capture time. In a step S50, a charge for the use of the line is calculated based on the line capture time, and data to be sent to the sub-control unit for displaying the capture time and charge is prepared in a step S51, and the data is sent to the sub-control unit for display in a step S52. In a step S53, a command to clear the line release flag is issued to the sub-control unit 6. In the step S53, since the line release flag of the sub-control unit 6 has been reset, the process proceeds to the step S34 where a stand-by command is issued to the sub-control unit 6.

When the sub-control unit 6 receives the stand-by command, the process proceeds from the step S3 to the steps S12, S14, S16, S18 and S20. In a step S21, the main power supply 7 is turned off and the process returns to the loop of the steps S1, S2 and S3.

Thus, when the telephone set is in the on-hook state at the end of transmission, the capture time and charge are displayed immediately after the end of transmission.

(B) If the telephone set TL is in the off-hook state at the end of transmission, the line is kept captured when the contacts cm1 are switched to the telephone set TL in the step S46. Accordingly, the process proceeds from the facsimile communication mode to the speech mode.

In the step S33, whether the line release flag of the sub-control unit 6 has been set or not is checked. Since it has not been set, the process proceeds from the step S33 to the step S34 where a stand-by command is issued to the sub-control unit 6. In a step S35, the turn-off of the main power supply 7 is monitored.

The sub-control unit 6 repeatedly carries out the loop of the steps S1, S2, S7 and S3, and when it receives the stand-by command, it proceeds to the steps S3, S12, S14, S16, S18 and S20, and turns off the main power supply 7 in the step S21. Thereafter, the subcontrol unit 6 repeatedly carries out the loop of the steps S1, S2, S7 and S3, and when the operator hangs up the telephone set TL, it proceeds from the step S7 to the step S8, where the line release flag is set and the line release monitor flag is reset so that the line release is no longer monitored. In a step S9, the time is read from the clock 11 and it is stored in the release time memory. In a step S10, whether the main power supply 7 is off or not is checked. Since it is off, the main power supply 7 is turned on in a step S11. Thereafter, it repeatedly carries out the loop of the steps S3, S1 and S2.

When the main power supply 7 is turned on, the main control unit 3 proceeds to a step S31. Since there is no key code, it proceeds to a step S32. Since the line release flag of the sub-control unit has been set, the process proceeds from the step S32 to a step S47 where the capture time (facsimile capture time + operator off-hook time) and the charge therefor are displayed. Then, the process returns to the wait state. Thus, even if the telephone set is in the off-hook state at the end of transmission, the correct line capture time to the on-hook time and the charge therefor are calculated.

In the case B, even if the main control unit is busy for the registration of the one-touch addressee telephone number or copy operation when the telephone set is hooked on, the correct line capture time and charge therefor are calculated. This is explained below.

If the telephone set is in the off-hook state after the transmission, the main power supply 7 is off, the sub-control unit 6 carries out the loop of the steps S1, S2, S7 and S3 and the on-hook state of the telephone set is monitored.

Under this condition, if the operator depresses the function key to register the one-touch addressee telephone number, the sub-control unit 6 proceeds from the step S1 to step S4, where whether the main power supply 7 is off or not is checked. Since it is off, the main power supply 7 is turned on in the step S5. In the step S6, the key code of the function key is sent to the main control unit 3. The sub-control unit 6 then returns to the loop of the steps S1, S2, S7 and S3.

In the step S31, the main control unit 3 receives the key code of the function key from the sub-control unit 6, and proceeds to the steps S36 and S37. Since it is not the key code of the one-touch key, the process proceeds to the step S38. In the step S38, if the registration is in process and the operator hooks on the telephone set, the sub-control unit 6 proceeds from the step S7 to the steps S8, S9 and S10 and repeatedly carries out the loop of the steps S1, S2 and S3.

When the registration in the step S38 is completed, the main control unit 3 proceeds to the step S33 where it checks whether the line release flag has been set or not. Since it has been set, the process proceeds to the step S47, and then to the steps S48, S49, S50, S51, S52 and S53. In the step S33, it again checks whether the line release flag has been set or not. Since it has not been set, the process proceeds from the step S33 to the steps S34 and S35 and then to a wait state.

In this manner, the sub-control unit stores the time when the line is released and the main control unit receives that time from the sub-control unit after the processing has been completed, to calculate the capture time. Accordingly, whatever timing the telephone set may be hooked on, the correct line capture time and correct charge are calculated.

In the present embodiment, when the line is connected, the command to start the monitoring of the release of the line is issued from the main control unit to the sub-control unit, and the line capture is stored in the nonvolatile memory.

Thereafter, the sub-control unit monitors the line release, and when it detects the line release, the time thereof is stored in the sub-control unit, and the flag to inform the line release to the main control unit is set. If the main power supply is off, it is turned on. The main control unit checks the line release flag when the main power supply is turned on and when some operation is terminated, and if the line is released, it receives the time thereof from the sub-control unit and compares it with the line capture time stored in the nonvolatile memory to calculate the line capture time and the charge therefor.

Even if the telephone set is in the off-hook state at the end of operation or it is hung up at any timing, the correct line capture time can be calculated and the correct charge can be calculated. While the line is captured by the telephone set, only the sub-control unit is in operation and wasteful power consumption is avoided.

While the facsimile machine has been explained in the present embodiment, the present invention is applicable to other communication apparatus having a speech mode such as teletex.

The present invention is not limited to the illustrated embodiment but various modifications may be made.

I claim:

1. A communication apparatus comprising:
   monitor means for monitoring if a line is released, after the line has been captured;
   memory means for storing time information on a line release time, when line release is detected by said monitor means;
   control means for controlling the apparatus, said control means receiving the time information from said memory means at an end of a predetermined operation;

a first power supply for supplying power to at least said control means; and a second power supply for supplying power to said monitor means, wherein said monitor means controls said first power supply.

2. A communication apparatus according to claim 1, wherein said control means receives the time information from said memory means at an end of a communication control operation.

3. A communication apparatus according to claim 1, further comprising display means for displaying a communication charge;

wherein said control means calculates the communication charge based on the time information stored in said memory means and causes said display means to display the communication charge.

4. A communication apparatus according to claim 1, wherein said monitor means turns off said first power supply when said control means completes a predetermined operation.

5. A communication apparatus according to claim 4, wherein said monitor means turns on said first power supply when said monitor means detects the line release after said first power supply has been turned off.

6. A data communication apparatus comprising:

data communication means for communicating data;

speech means;

detection means for detecting line capture and line release;

memory means for storing data relating to a line capture time supplied from said detection means;

control means for controlling data communication;

said control means receiving the data from said memory means after the data communication control;

a first power supply for supplying power for data communication; and a second power supply for supplying power to said detection means and said memory means, wherein said detection means controls turn-on and turn-off of said first power supply.

7. A data communication apparatus according to claim 6, further comprising display means for displaying a communication charge;

wherein said control means calculates the communication charge based on the time information stored in said memory means and causes said display means to display the communication charge.

8. A data communication apparatus according to claim 6, further comprising switch means for switching said data communication means and said speech means;

wherein said detection means turns off said first power supply when said switch means selects said speech means.

9. A data communication apparatus according to claim 6, wherein said detection means turns off said first power supply when said control means terminates data communication control.

10. A data communication apparatus according to claim 9, wherein said detection means turns on said first power supply when said detection means detects the line release after said first power supply has been turned off.

11. A data communication apparatus comprising:

data communication means for communicating data;

speech means;

detection means for detecting line capture and line release;

control means for controlling data communication; and a first power supply for supplying a power for data communication;

wherein said detection means controls turn-on and turn-off of said power supply turns off said power supply when the data communication control by said control means terminates, and turns on said power supply when the line release is detected after the turn-off of said power supply.

12. A data communication apparatus according to claim 11, further comprising:

memory means for storing data on a line capture time supplied by said detection means;

wherein said control means receives said data from said memory to calculate the line capture time.

* * * * *

UNITED STATES PATENT AND TRADEMARK OFFICE
CERTIFICATE OF CORRECTION

PATENT NO. : 4,837,813
DATED : June 6, 1989
INVENTOR(S) : HISAO TERAJIMA

It is certified that error appears in the above-identified patent and that said Letters Patent is hereby corrected as shown below:

IN [54] TITLE

"FEATURED" should read --FEATURE--.

COLUMN 1

Line 4, "FEATURED" should read --FEATURE--.

COLUMN 2

Line 53, "powers" should read --power--.

COLUMN 3

Line 63, "pulse relay contact p" should read --pulse relay contact P--.

COLUMN 5

Line 61, "transmission, the" should read --transmission, and the--.

COLUMN 7

Line 14, "comprising" should read --comprising:--.

UNITED STATES PATENT AND TRADEMARK OFFICE
CERTIFICATE OF CORRECTION

PATENT NO. : 4,837,813
DATED : June 6, 1989
INVENTOR(S) : HISAO TERAJIMA

Page 2 of 2

It is certified that error appears in the above-identified patent and that said Letters Patent is hereby corrected as shown below:

COLUMN 8

Line 2, "comprising" should read --comprising:--.
Line 10, "comprising" should read --comprising:--.
Line 32, "a power" should read --power--.
Line 35, "supply turns" should read --supply, turns--.

Signed and Sealed this

Eighth Day of May, 1990

Attest:

HARRY F. MANBECK, JR.

*Attesting Officer*     *Commissioner of Patents and Trademarks*